Sept. 1, 1931.  H. G. PLUMMER  1,821,274
FLEXIBLE PIPE JOINT
Filed July 1, 1926
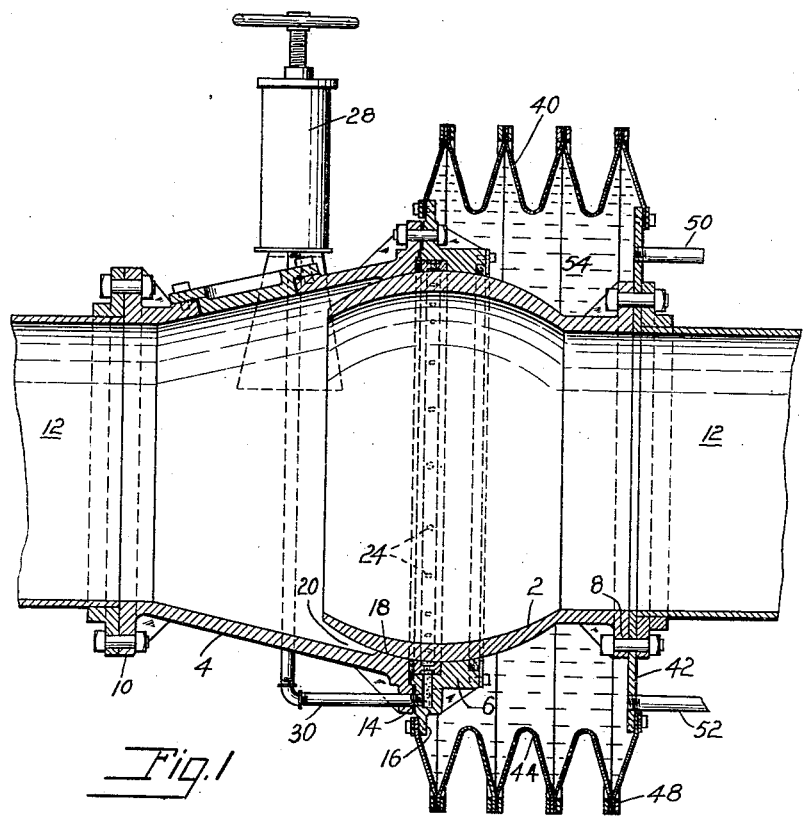
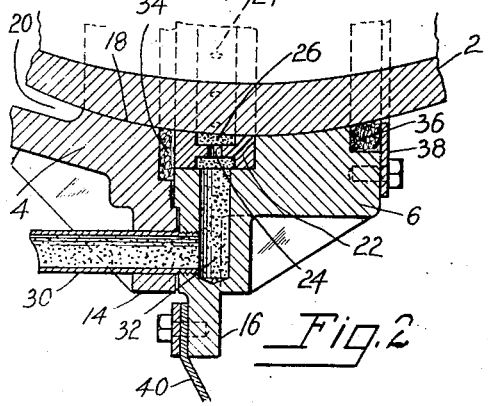
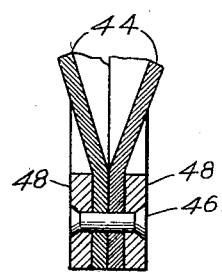
INVENTOR.
Henry G. Plummer
BY M. C. Frank
ATTORNEY.

Patented Sept. 1, 1931

1,821,274

UNITED STATES PATENT OFFICE

HENRY G. PLUMMER, OF OAKLAND, CALIFORNIA, ASSIGNOR TO PACIFIC COAST ENGINEERING COMPANY, OF OAKLAND, CALIFORNIA, A CORPORATION OF CALIFORNIA

FLEXIBLE PIPE-JOINT

Application filed July 1, 1926. Serial No. 119,931.

My invention relates to flexible pipe-joints, and more particularly to a universal pipe-joint which is sealed to be airtight as well as watertight. Its special sphere of usefulness is in suction piping and especially in suction dredges.

An outstanding problem of hydraulics is the maintenance of suction head. Leaks in suction piping are difficult to trace because the leakage is inward and there is no dripping or other visible indication of leakage. These leaks are more difficult to avoid because they are air leaks, not water leaks, and a hole small enough to be watertight may leak air. They are more serious because of the greater rapidity of air leakage. Thus, in a punctured water pipe carrying a suction of say two pounds per square inch below atmospheric pressure, volumetric leakage of air through the puncture is approximately forty times as great as would be the leakage of water if the pressure condition were reversed to two pounds per square inch above atmospheric. It is recognized that no ordinary flexible pipe-joint can practicably be maintained absolutely leakproof, and where these joints must be used on suction piping, as in dredge work where sand and grit must be additionally contended with, the leakage is a serious matter.

It is therefore the object of my invention to provide a flexible pipe-joint which, (1) reduces the likelihood of leakage to a minimum, (2) substitutes a liquid for air, as the leaking medium, (3) and permits adjustment to change of pressure or substance within the joint. It is further the object of my invention to produce a flexible pipe-joint in which wear is minimized, and in which the leak-producing effect of wear is curtailed.

Other objects of invention, including those which arise from the preferred specific construction of my device, will appear in the following specification. It is to be understood that the advantageous purposes accomplished by my invention are dictated somewhat by its use, as also by the selectable conditions of grease and water pressure used in effecting a seal. Moreover, it is possible to accomplish some of these features of invention with less than all the details which go to make up its preferred form. For these reasons it is desired that the invention be confined only by the limits of the claims.

Referring to the drawings:

Figure 1 is a vertical longitudinal section of the assembled flexible joint, and Figs. 2 and 3 are enlarged similar sections of details of the assembly; Fig. 2 illustrating the lower portion of the ball-and-socket joint, and Fig. 3 a portion of the enclosing bellows.

A ball-and-socket universal joint is formed by the mating male or ball member 2, and female or socket member 4, 6, and is provided with standard flanges 8 and 10 adapting it to be bolted in the suction pipe line 12, of a suction dredge, for example. The female member is an assembly of a bell-mouthed casting 4, and a ring member 6, secured together by the bolted flanges 14, 16, and having an inwardly extending broad flange 18, the face of which is concaved into a spherical seat for the ball member 2.

In the usual construction, the space at 20, formed between the bell-mouthed housing and the spherical end of the male member, tapers to a sharp edge and causes sand and grit wedging therein to be "worked" into the joint. This results in excessive wear and may cause the solid particles to wedge into and jam or break the joint. In my construction this is prevented by the flange 18, which rises sharply from the surface of the bell-mouthed member 4, and tends to wipe the sand and grit back from the joint.

Means are provided to make the ball-and-socket joint watertight. An annular grease groove in the joining face of the ring member 6 houses an H-section grease ring 22 having its web pierced at predetermined points by apertures 24 to insure proper distribution of grease. The groove is kept filled with heavy grease 26 under pressure; a grease gun 28 being connected to this groove by piping 30 leading to a channel 32 in the ring member 6. This grease forms a fairly effective barrier against leakage, and performs the added function of excluding from the joint, the fine grit which passes the wiping flange 18. This latter function of the grease dictates its introduction at the lower portion of the joint where most of the grit tends to enter. A similar effect could be obtained with the grease inlet at the top, by placing most of the apertures 24 at the lower portion of the ring. It may be noted that the grease will lubricate the joint, but this is not its major purpose, for to secure most effective lubrication, oil, and not grease, would need to be used. If desired, any additional means (not shown) may be provided to supply lubricating oil to the ball and socket joint. Oil alone is ineffective to prevent leakage because of its insufficient body.

It is intended that the grease not only be supplied under pressure, but also be maintained under positive pressure within the groove. To further this end, and also to act as an added seal against leakage, suitable packing rings 34 and 36 are provided, one on each side of the grease groove. The ring 34 is housed in a groove formed in the joining face of the bell-mouthed casting 4, adjacent the grease groove in the juxtaposed member, so that the packing ring 34 is secured at its outer portion between the female members 4 and 6 to form a gasket, and at its inner portion it forms a movable packing between the male and female members of the joint. This packing may be compressed by tightening the bolts on the flanges 14, 16. The packing ring 36 is housed in an annular groove at the outer end of ring member 6, and a bolted clamping ring 38 retains it under pressure. The sides of these packing ring grooves extend practically to the surface of the male member and a stiff material such as a wire-reinforced packing is used for the packing rings, so that the packings are effective to prevent leakage in both directions.

A watertight bellows 40, enclosing the ball-and-socket joint, is secured at one end to the flange 16 of the female member, and at the other end to a flange 42 bolted to the male member. This bellows is formed by V-section annular rings 44, of flexible material such as canvas inserted rubber, spring brass, or of other suitable material, secured together at their free edges by rivets 46 through metallic clamping rings 48. Though this bellows may be made watertight, it can hardly be expected to be and remain airtight. Moreover, if it were airtight and exposed to any appreciable vacuum from within the pipe line, it would collapse. I avoid these problems by providing an external means for supplying water to the bellows, and my invention involves maintaining it full of liquid. Pipes 50 and 52 in the flange 42 may either or both be connected to the ordinary water mains, or may be connected to any other source of liquid supply at whatever pressure is desired. By this means a body of liquid 54 is maintained in the bellows.

Assuming a positive pressure of liquid within the pipe line 12, the band of grease, together with the packing rings 34 and 36, resist escape of the liquid and make the joint nearly watertight. Some leakage may occur however, especially if wear has been excessive, and if it is desired to absolutely prevent this leakage, the pipes 50 and 52 will be connected to a source of liquid under pressure equal or nearly equal to the pressure within the pipe line. In this case a viscous oil might be used as the body of liquid 54.

Assuming a negative pressure within the said pipe line, the band of grease together with its packing rings 34 and 36 will be relied upon to practically prevent the liquid within the bellows from passing into the pipe. In this case water should be used in the bellows; preferably only enough pressure being used to keep the bellows full of water. Thus the lower pipe 52 may be connected to a pressure source, and the upper pipe 50 be used as an overflow. Even if some leakage does occur past the ball-and-socket joint, it will not be air, but water, that is sucked into the pipe line, and therefore the harmful effect will be minimized.

When the pipe line is used to conduct gas under pressure, the bellows may be kept full of water, oil, or other liquid, at a pressure equal to or greater than the pressure within the pipe to positively prevent leakage of gas.

Other uses of my improved flexible joint will at once suggest themselves. The above examples are selected to merely indicate its manner of application and sphere of usefulness.

I claim:

1. In a ball-and-socket joint comprising a ball-ended pipe, a socket-ended pipe in mating contact therewith, and packing compressedly engaged by and between the engaged pipe to provide a barrier to leakage past the joint, a liquidtight bellows enclosing said joint, and means for conducting liquid under pressure to the space within said bellows whereby the ball-and-socket joint may be submersed in liquid at a pressure determinable relative to the pressure within said joint.

2. In a ball-and-socket pipe-joint, a ball-ended pipe, and a socket-ended pipe in mating relation therewith and having an annular groove in its mating surface, a quantity of heavy grease filling said groove for sealing the joint, means for forcing grease under pressure into said groove, and packing rings at each side of said groove and compressedly engaged between the opposed ball and socket surfaces for retaining the grease under pressure between them and within the joint; said packing rings being adapted to resist leakage in both directions, whereby said joint is operable interchangeably on pressure and vacuum lines.

3. In a suction pipe-line, a ball-and-socket universal joint comprised of a ball-ended pipe, a socket-ended pipe in mating relation therewith and having an annular groove in its mating surface, a quantity of grease filling said groove to form a leak-restraining grease band, means for forcing grease under pressure into said groove, and packing rings on each side of said groove for retaining the grease under pressure within the joint, a liquidtight bellows enclosing the joint, a body of liquid in the bellows submersing said joint, and means for replenishing the liquid which leaks into the suction pipe-line.

4. In a pipe line jointure a ball-ended pipe and a socket-ended pipe in mated relation therewith to provide an inner flexible pipe joint, means for resisting leakage of liquid pressure inwardly through said inner joint, an outer fluidtight bellows joint enshrouding said inner joint, a body of liquid in said outer joint and immersing said inner joint, and means for introducing liquid to compensate for leakage, whereby leakage of air into said piping is prevented.

5. In a pipe-line, a ball-and-socket universal joint comprising a ball-ended pipe, a socket-ended pipe in mating relation therewith and having an annular groove in its mating surface, a quantity of grease filling said groove to form a leak-restraining grease band, a fluidtight bellows enclosing the joint, and a body of liquid in the bellows submersing said joint.

6. In a ball-and-socket pipe joint, a ball-ended pipe, a socket-ended pipe in mating engagement therewith, packing compressedly engaged by and between said pipe ends to seal the joint thereat, means fixing said packing to the socket pipe end for wiping engagement with the opposed surface of the ball pipe end, and a liquidtight bellows enclosing said joint and containing liquid.

7. A universal joint of the character described comprising a ball, a socket engaging the ball and having an annular groove formed therein adjacent the ball, a grease ring in said groove, and means for introducing grease under pressure into said groove.

8. A universal joint of the character described comprising a ball, a socket engaging the ball and having an annular groove formed therein adjacent the ball, packing means in one end of said groove, a grease ring in the groove, and means for introducing grease under pressure into the groove.

9. A universal joint of the character described comprising a ball, a socket engaging the ball and having an annular groove formed therein adjacent the ball, a grease ring of H-shaped cross section in the groove, and means for introducing grease under pressure to the groove.

10. A universal joint of the character described comprising a ball, a socket engaging the ball and having an annular groove formed therein adjacent the ball, a ring of H-shaped cross section in the groove, said ring having apertures formed therein for the passage of grease, and means for introducing grease under pressure to the groove.

In testimony whereof I affix my signature.

HENRY G. PLUMMER.